UNITED STATES PATENT OFFICE.

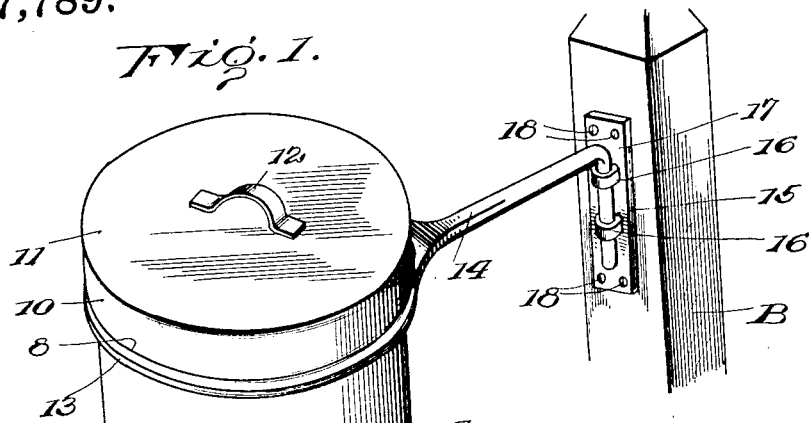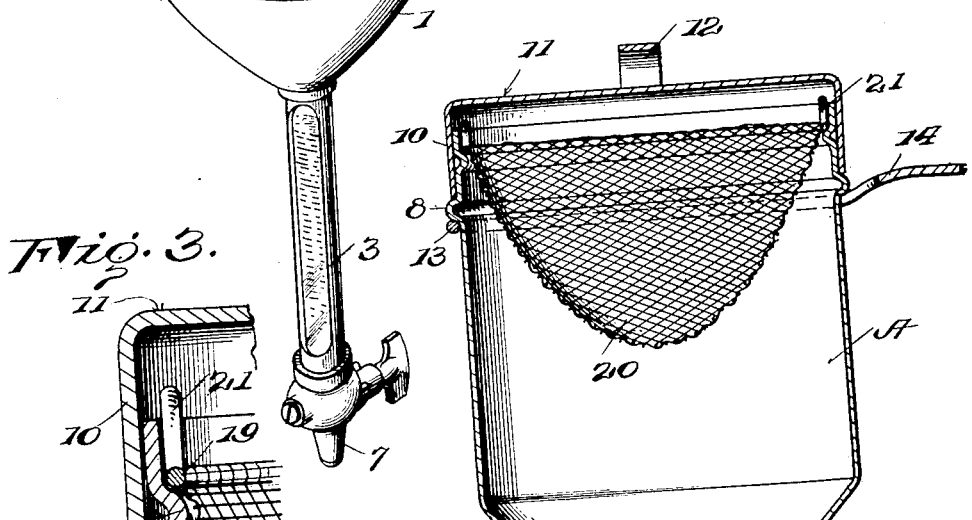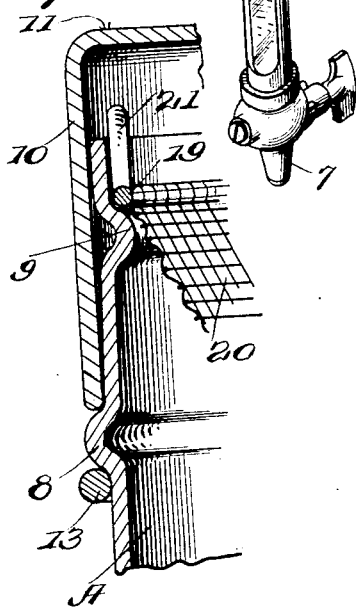

HARVEY E. LYONS, OF BALTIMORE, MARYLAND.

COMBINED STRAINER AND FAT-SEPARATOR.

1,387,789.

Specification of Letters Patent. Patented Aug. 16, 1921.

Application filed February 6, 1920. Serial No. 356,657.

*To all whom it may concern:*

Be it known that I, HARVEY E. LYONS, a citizen of the United States, residing in the city of Baltimore and State of Maryland, have invented certain new and useful Improvements in Combined Strainers and Fat-Separators, of which the following is a specification.

This invention relates to a strainer and fat separator for soups.

The production of soups, especially those made from meat is attended with the freeing of considerable fat in the form of grease which, in order to render the soup more palatable must be removed before serving. In accomplishing this removal of the excess grease or fat various methods are used such as skimming and the like which methods are relatively unsatisfactory in that, unless great care is used, there is considerable waste of the fat-free or grease-free soup stock.

In order to obviate the difficulty above mentioned the present invention has as one of its objects the provision of a device for straining soup and also freeing the same of grease by decanting off the fat-free or grease-free soup.

The invention has as a further object the association of a decanting tube of relatively small size with a container of a considerable number of times the diameter of the tube, said tube being provided with sight openings on diametrically opposite sides, this construction affording a view of the line of demarcation between the grease and fat-free soup so that flow through the tube may be stopped when such line reaches a certain level in the sight opening and no fat-free soup will be wasted in remaining with the grease, the particular point of this construction being that the volume of the tube is so small that at the time the said line of demarcation comes into view only a very small volume of fat-free soup will remain in the tube.

Another object of the invention is the provision of a container and a support of ring-like form therefor, the container being ribbed circumferentially on the exterior near the top to reinforce the said container and at the same time provide a means of seating the container in the ring like support and the rib further provides a seat for a cover fitting the top of the container thus giving a threefold function to the supporting rib. Another circumferential reinforcing rib is formed in the container above the previously mentioned rib and carries a strainer, the handles of which project beyond the upper edge of the container so that they may be readily grasped to remove the strainer.

A still further object is the provision of a sight opening in the decanting tube which opens clear through the tube and is closed by a glass tube telescoped within the decanting tube.

In the drawings—

Figure 1 is a view of the strainer and fat separator in perspective;

Fig. 2 is a vertical central section thereof, and

Fig. 3 is an enlarged fragmentary section.

In detail: The invention comprises a cylindrical body A having the concave bottom 1 with the central opening 2 into the decanting tube 3 open at both sides as indicated at 4 and receiving the glass tube 5 seating at the upper end against a lip 6 surrounding the opening 2; said glass tube 5 being held in place at the bottom by a spigot 7 of any of the usual forms and which closes the end of the decanting tube 3.

Adjacent the top the cylindrical body A is ribbed circumferentially on the exterior as shown at 8 to reinforce the body and is reversely ribbed as shown at 9 for the same purpose. However, the rib 8 serves a threefold purpose in that, in addition to reinforcing the body A it provides a seat for the flange 10 of a cover 11 having a handle 12 and, at the same time seats on a ring like member 13 of a support 14 having a right angle extension 15 engaged with loops 16 in a plate 17 mounted in any suitable way, as by screws 18 on a suitable supporting member such as B.

The reinforcing rib 9 also serves to support the ring 19 of a strainer 20, the handles 21 of which extend upwardly above the top edge of the body A so that they may be readily grasped for removal of said strainer, and the cover flange 10 is made of sufficient depth so that said cover 11 clears these handles when in place and fits snugly down onto the rib 8 as previously described.

In using the strainer and fat separator, the soup stock is poured into the container A through the strainer 20 to remove solid matter and the grease or fat is then allowed to come to the top, after which the spigot 7 is opened to draw off the fat-free soup at the bottom; and when the fat-free soup is practically exhausted the line of demarcation C dividing the fat-free soup from the fat or grease will appear in the decanting tube 3, and by reason of the small diameter of said decanting tube as compared with the body A of the container, the remaining volume of fat-free soup at this period will be negligible and no fat-free soup will be wasted.

While the interior reinforcing rib 9 in the drawing is formed below the upper edge of the container A it is nevertheless obvious that the same might be formed on the top edge of the container or immediately adjacent the exterior rib 8.

While the combination strainer and grease separator has been herein described as particularly adapted for soups, it is nevertheless equally well adapted as a general kitchen utensil for straining other fluids. Also it is especially well suited for straining any kitchen product which it is desired to separate the grease from for the purpose of rendering up the grease for later use.

I claim:

A strainer and fat separator for soups, comprising a container having an exterior circumferential reinforcing rib and an interior circumferential reinforcing rib, both ribs being located adjacent the top of the container whereby a reinforced rim is provided, a cover telescoping over said container and seating at its lower edge on said exterior rib, a container support receiving the said container as far as the exterior rib, and a strainer within the container and having handles and supported on the interior reinforcing rib whereby said handles project above the top edge of the reinforced rim of said container, said cover having a depth sufficient to permit the top thereof to clear said handles.

In testimony whereof I affix my signature.

HARVEY E. LYONS. [L. S.]